Figure 1A:
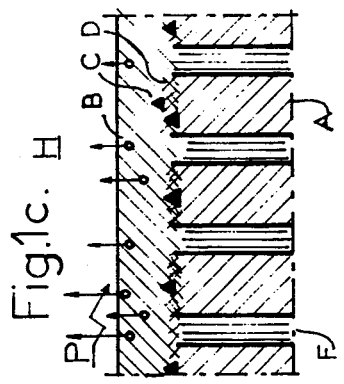

United States Patent [19]

Galmiche et al.

[11] 4,055,706
[45] Oct. 25, 1977

[54] PROCESSES FOR PROTECTING REFRACTORY METALLIC COMPONENTS AGAINST CORROSION

[75] Inventors: Philippe M. Galmiche, Clamart; Pierre J. Lepetit, Saint-Vrain, both of France

[73] Assignee: Office National d'Etudes et de Recherches Aerospatiales (O.N.E.R.A.), Chatillon-sous-Bagneux, France

[21] Appl. No.: 594,802

[22] Filed: July 10, 1975

[51] Int. Cl.² ............................................. B23P 3/00
[52] U.S. Cl. .................................... 428/652; 148/178; 148/186; 427/226; 427/252; 427/343; 427/377; 427/383 D; 427/405; 427/437; 427/438; 428/661; 428/678
[58] Field of Search ............... 427/383, 343, 226, 438, 427/437, 377, 252, 250, 305, 383 D, 405; 148/178, 186; 428/652, 661, 678

[56] References Cited

U.S. PATENT DOCUMENTS

| 3,000,755 | 9/1961 | Hanink et al. ..................... 427/383 |
| 3,163,553 | 12/1964 | Commanday et al. ............. 427/383 |
| 3,432,338 | 3/1969 | Sickles ............................... 427/437 |
| 3,553,003 | 1/1971 | Carlton et al. ..................... 428/379 |
| 3,562,000 | 2/1971 | Parker ................................ 427/383 |
| 3,589,927 | 6/1971 | Holker ............................... 427/377 |
| 3,728,149 | 4/1973 | Forand et al. ..................... 427/377 |
| 3,917,464 | 11/1975 | Pearlstein et al. ................. 427/438 |
| 3,922,396 | 11/1975 | Speirs et al. ...................... 427/250 |
| 3,929,427 | 12/1975 | Kotval et al. ...................... 428/457 |

FOREIGN PATENT DOCUMENTS 644,472  8/1964  France ................................. 427/383

Primary Examiner—Ronald H. Smith
Assistant Examiner—Janyce A. Bell
Attorney, Agent, or Firm—Larson, Taylor and Hinds

[57] ABSTRACT

In the process of forming a coating selected from nickel and cobalt-based coatings on a surface of a component made of a metallic material having a total composition by weight comprising at least 50% of metal selected from the group consisting of iron, cobalt and nickel, the improvement comprising forming at least one layer of an alloy of boron with one of nickel, cobalt and nickel/cobalt on the component, after which the boron is eliminated.

12 Claims, 6 Drawing Figures

PROCESSES FOR PROTECTING REFRACTORY METALLIC COMPONENTS AGAINST CORROSION

This invention relates to treatment for protecting metallic components against corrosion by forming non-corrodible metal deposits forming a protective casing. It relates more particularly but not exclusively to protection against corrosion at high temperature in an oxidising or oxidising and reducing or sulphurising atmosphere, the protection being given to components made of refractory metallic materials of the kind sometimes called "super-alloys" based on metals in the group comprising iron, cobalt and nickel and having a composition by weight comprising at least 50% of metal(s) from the aforementioned group. The invention relates inter alia to the protection of those of the aforementioned materials having a high carbon content, for example at least equal to 0.4%, for forming refractory carbides with added elements from the group comprising chromium, molybdenum, tungsten, tantalum, niobium and the like. However, it should be noted that the method can be applied to the protection of non-refractory metallic materials comprising at least 50% of metal from the group comprising iron, cobalt and nickel.

In general, the invention involves a process of the kind sometimes called a "duplex" process, wherein a first simple or composite casing (hereinafter called a "pre-casing") is formed, followed by a second simple or composite casing, hereinafter called "casing" tout court, the casing providing the required protection and the pre-casing being adapted, inter alia, to facilitate the bond between the casing and the base material and to ensure that the different surface regions of the components behave in a uniform manner during the casing treatment. In the process according to the invention, the casing treatment is usually a known thermo-chemical deposition and diffusion treatment, that is the components after the pre-casing operation, are heated in an atmosphere containing the coating elements in the state of compounds which are gaseous at the processing temperature. Preferably, the casing process is carried out in a hydrogenated and halogenated atmosphere and is adapted to provide a refractory, non-corrodible casing on the components by deposition and diffusion, containing considerably higher proportions of aluminium and/or chromium than the processed material.

The metal components to which the invention may be applied can be constructed by any known method, such as casting, forging, sintering or electro-forming. They can be compact or porous and monolithic or composite, that is made by brazing or soldering elementary components, which may be made of different materials.

Before describing the present invention and setting out the advantages thereof, the circumstances in which a precasting may need to be formed before the casing when the latter is produced by thermochemical means will be described. In general, casings giving very good corrosion resistance, when hot, to components made of refractory metallic materials can be obtained thermochemically, inter alia by deposition and diffusion in a halogenated atmosphere, provided that the surfaces of the components do not have appreciable non-uniformities before treatment. In this respect, refractory alloys containing more than 0.4% carbon pose special problems. Those of the aforementioned alloys which are used in conventional casting or sintering methods, for example type X40 cobalt alloys (cobalt base; added chromium, nickel, tungsten, iron and 0.5% carbon) or type MAR 509 alloy (cobalt base; added chromium, nickel, tungsten, tantalum, titanium, zirconium and 0.6% carbon) comprise considerable carbide inclusions, some of which crop out at the surface. After the components have been coated and are in service, with exposure to hot oxidising or sulphurising gases, local pitting, the start of serious corrosion, may occur at the inclusions. Furthermore, these local surface non-uniformities may be multiplied as a result of a special structure which is deliberately given to the components by a special method of solidification. It is known that components having high mechanical strength and comprising oriented reinforcing fibres made of tantalum carbide, niobium carbide or the like in a nickel or cobalt matrix containing various added elements such as chromium, can be obtained by guided solidification, taking advantage of eutectic segregation phenomena. Each fibre end terminating at the surface forms a heterogeneity which can result in pitting of the aforementioned kind and start corrosion.

Attempts have already been made to eliminate the effects of the aforementioned structural details on casings obtained by thermochemical means.

In a first class of known methods, attempts are made to reduce the heterogeneity surface gradients by surface annealing, that is by local decarburation or partial dissolving of the surface inclusions by subjecting the components to prolonged heating at high temperature in a pulverulent material containing for example a refractory diluent and powdered nickel and sulphur. This kind of method is expensive owing to the prolonged heating and the rapid pollution of the material, but mainly owing to the necessity of polishing the thus-processed components to give them a suitable surface state before the casing operation.

In a second class of known processes, sometimes called "duplex" processes, a pre-casing deposit is produced by electrolytic means before the thermochemical casing treatment. Pre-casings have been produced inter alia from nickel or platinum. In general, however, electrolytic coatings have a low penetration power and the thickness and composition of the deposited layers becomes more irregular when the processed components have a more complex shape. This kind of process, therefore, does not give satisfactory results when it is applied to engine components having complex shapes, for example sectors containing stationary or mobile turbine blades, or blades cooled by convection, by a spray of fluid, by liquid films, or by blowing into multiple ducts. Furthermore, even after diffusion, electrolytic nickel deposits have low resistance to the thermal stresses undergone by the components during thermochemical casing treatment or during operation, and the casings are finally liable to blister or separate, resulting in rapid destruction. Platinum pre-coatings, on the other hand, are inefficient on cobalt-based materials but frequently satisfactory on nickel-based materials, but their cost is prohibitive for many applications, since the deposited thickness should be between 10 and 20 microns.

It is an object of one aspect of the invention to provide a pre-casing process which is relatively economic, easy to work, and applicable to metallic components having complex shapes or to composite components and components having considerable surface non-uniformities due more particularly to inclusions or fibres of metal carbides or heavy-element compounds extending to the surface of the material.

It is a further object of another aspect of the invention to provide a process of protecting components made of refractory metallic materials, involving the deposition of a pre-casing and the deposition of a casing and giving the components high and long lasting resistance to corrosion at high temperature, inter alia by oxidation or sulphuration, more particularly during heating cycles involving abrupt variations.

It is also a subsidiary object of another aspect of the invention to provide a process of assisting prevention of corrosion to composite components constructed by assembling elementary components by brazing, using hard solders containing boron.

According to the first aspect of the present invention there is provided a process for forming a nickel or cobalt-based coating on a surface of a component made of a metallic material having a total composition by weight comprising at least 50% of metal from the group consisting of iron, cobalt and nickel, which process comprises forming at least one layer of an alloy of nickel and/or cobalt with boron on the surface of the component, and thereafter eliminating the boron from the layers(s).

According to the second aspect of the present invention there is provided a process for providing a metallic component with a covering giving protection against corrosion at high temperatures, which process comprises depositing a pre-casing, followed by a casing, the pre-casing being produced by a process according to a process as defined in the preceding paragraph.

According to the third aspect of the present invention there is provided a component made of metallic material, inter alia refractory metallic material, covered with a casing made from a metal alloy containing chromium and/or aluminium in substantially higher proportions than the metallic material, wherein the region where the metallic material is bonded to the coating alloy contains dispersed particles of at least one defined compound containing boron.

The invention relates not only to the aforementioned processes but also to components treated by the aforementioned processes and to components having special surface structures produced inter alia by the processes according to the invention.

The process according to the invention for pre-casing metallic components comprises forming at least one layer of an alloy containing boron and at least one metal in the group comprising cobalt and nickel on the components, preferably by chemical means, and in subsequently subjecting the components to thermo-chemical treatment for substantially eliminating the boron and producing partial diffusion of a or the pre-casing metals into the material.

The process according to the invention for protecting metallic components comprises producing a pre-casing on the components, the pre-casing comprising at least one metal layer containing at least one metal of the group comprising cobalt and nickel according to the aforementioned pre-casing process, and in subsequently producing a casing of alloy containing chromium and/or aluminium in proportions substantially greater than those of the treated material, preferably by heating the components in a hydrogenated and halogenated atmosphere containing at least one chromium and/or aluminium halide in vapour form.

The metal components according to the invention comprise a metallic material surrounded by a first metal casing comprising at least one layer of at least one metal in the group comprising cobalt and nickel, the casing also containing dispersed particles of boron carbide and/or carbonitride, and a second metal casing containing chromium and/or aluminium in proportions substantially greater than those in the material.

Figure 1B:
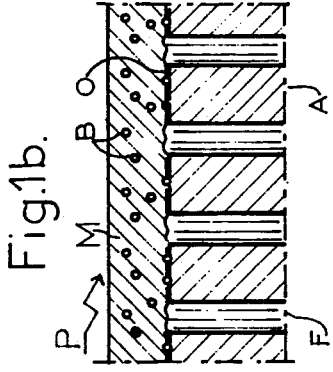
Figure 1C:
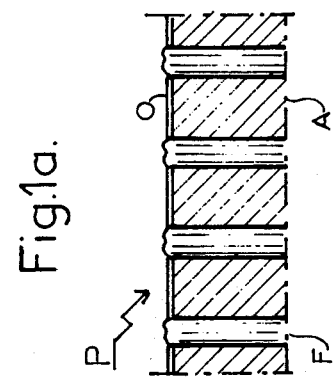
Figure 2A:
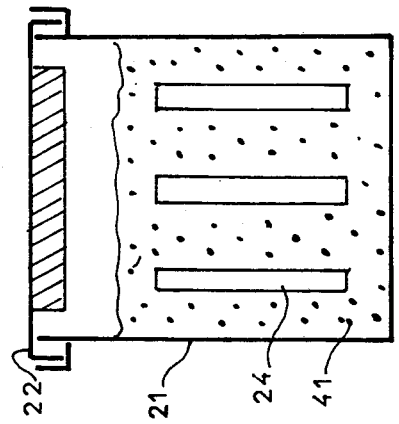
Figure 2B:
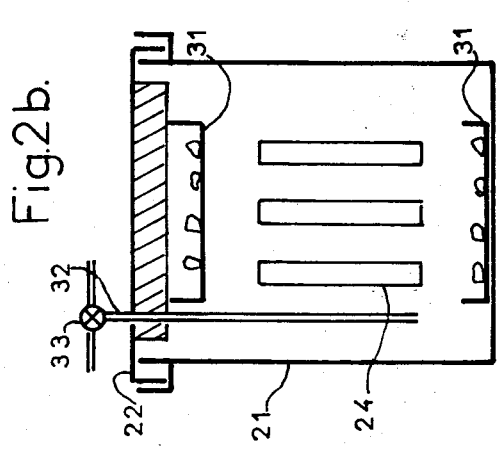

For a better understanding of the present invention, reference will now be made, by way of example, to the accompanying drawing, in which:

FIG. 1 shows a group of diagrams illustrated in chronological order the phenomena occurring during the construction of a pre-casing according to the invention, and FIG. 2 shows a group of diagram illustrating examples of the pre-casing process according to the invention and showing other features and advantages.

It is convenient at this juncture to explain why, according to the invention, a or the pre-casing metals are deposited at the same time as boron, which is then eliminated by special treatment so as to prevent its harmful effects on the behaviour of the refractory casing while taking advantage of its properties during the formation of the deposit.

Conventional methods of deposition by chemical means can provide satisfactory nickel-boron or cobalt-boron or nickel-cobalt-boron layers. Chemical deposits from aqueous baths containing the aforementioned metals and boron-based reducing compounds are easy to produce, commonly used in industry, very adhesive and have a very regular thickness, irrespective of the complexity of the shape of the processed components. Furthermore, if it is desired not to coat certain regions of the components, it is easy to provide resists, using varnish or collodion or other masks so that, if required, pre-casings of different thicknesses can be obtained on a single component, by removing the masks at the right moment.

By way of example, an aqueous bath for chemical deposition of nickel-boron alloy can have the following composition:

| | |
|---|---|
| nickel chloride: | 30 g/liter |
| ethylene diamine | 60 g/liter |
| caustic soda | 40 g/liter |
| sodium boranate | 0.5 g/liter |

A bath of this kind has a pH of between 12 and 14 and, at a temperature of between 90° and 92° C., the rate of deposition is between 10 and 20 microns per hour. The deposited nickel-boron alloy generally contains from 5 to 7% boron, melts at 1070° to 1080° C. and has a mass per unit volume of 8.2 g per cubic cm.

The resulting alloy cannot be used as a pre-coating layer since, as is known, a high boron content has an extremely adverse effect on the resistance to corrosion, when hot, of the subsequently deposited casing layer, owing to the high chemical activity of boron, inter alia its affinity for oxygen. Consequently, before the casing is thermochemically processed, the boron in the pre-casing has to be eliminated by special thermal treatment which also serves to produce partial diffusion of the pre-coating metal (nickel and/or cobalt) into the material substrate. This need to eliminate boron by special thermal treatment might be considered as a disadvantage, but on the contrary has great advantages. First, the elimination cannot be produced simply by heating the pre-cased components in vacuo or in an argon or hydrogen atmosphere. On the other hand, elimination is practically total (apart from a fraction which, as we shall see, has an advantageous effect) if the components are heated in a halogenated reducing atmosphere for between a fraction of an hour and several hours at temperatures between 850° and 1300° C.

Accordingly, there can now briefly, with reference to the diagrams in FIG. 1, be described the elimination mechanism and the part played by boron. Diagram 1a is a cross-section of a non-coated component P which, in a cobalt-chromium, nickel-chromium or other alloy matrix A, comprises tantalum carbide, niobium carbide or similar fibres F terminating at the surface of the component. The surface is inevitably covered with a thin layer 0 of various oxides or impurities which may prevent a pre-casing or casing layer from sticking. Diagram 1b shows the same cross-section after deposition of a pre-casing metal layer M between 10 and 20 microns thick (nickel or cobalt) in which boron atoms B are distributed.

Boron is a non-metal whose compounds, more particularly with oxygen and halides, have a very high free enthalpy of formation. Boron halides are very volatile and very stable. In spite of the presence of the O layer and the high chemical activity of boron atoms, they are intimately bonded to the substrate, as shown by diagram 1b.

In diagram 1c, component P is shown in the presence of a halogenated atmosphere H having a suitable composition, examples of which will be given hereinafter. In proportion as the temperature rises, the boron atoms, owing to their great affinity for halogens, escape by diffusion through the pre-casing layer M, and the atoms attached to the substrate are replaced by metal atoms. Consequently, a diffusion layer D forms between the metals in the substrate and the metals in the pre-casing layer. The metals are not in any way corroded by the halogens in the atmosphere.

The pre-casing alloy does not melt at any time, since its melting point increases as the boron content decreases.

Examination with an electronic micro-probe shows that a very small proportion of the boron initially present in the pre-casing remains fixed in the form of a very fine dispersion of particles C of very stable compounds such as carbides or carbonitrides, by exchange of carbon or nitrogen with the less stable compounds, for example chromium carbide or tungsten carbide, initially present in the surfaces of the treated components. Particles C subsequently form a barrier preventing the subsequently-deposited protected casing from re-diffusing, and substantially increasing its service life.

The choice of operating conditions for the various steps of the process according to the invention will now be discussed, depending on the initial properties of the components and the desired results.

With regard to the step in which the nickel-boron or cobalt-boron or nickel-cobalt-boron alloy layer is deposited, there are no special problems in adapting the composition of the bath to the desired pre-casing composition. There has already been given an example of a composition for a nickel-boron bath. Cobalt-boron or nickel-cobalt-boron baths may be identical, except that a varying proportion of the nickel ions is replaced by cobalt ions. The thickness of the chemical deposit can be controlled by varying the time during which the components are immersed in the bath. The thickness of the deposit can be between for example 5 and 70 microns, depending on the case, but values between 10 and 40 microns are usually preferable. The optimum thickness is usually of the order of 20 microns, which is obtained by about 2 hours immersion in a bath having the aforementioned composition. The thickness can be made more uniform by mechanically agitating the bath, for example by ultrasonic excitation or blowing gas. When the components to be processed having more complex shapes, the method is correspondingly more useful. According to another feature, the aforementioned masking processes can be used to adjust the thickness of the coating on various regions of a single component, depending on the stresses to which they will be subjected during operation.

The treatment for eliminating boron and diffusing the pre-casing can be performed by various methods, depending on the desired results.

Diagram 2a in FIG. 2 relates to a method of treatment in a reducing fluorinated atmosphere at equilibrium with regard to the reduction of chromium fluoride, that is not chromizing. A processing vessel 21 adapted to be placed in a furnace (not shown) is closed by a cover 22 which is semi-tight, that is allows limited exchanges between the atmosphere of the vessel and the surrounding atmosphere. At the bottom of vessel 21, there is a layer 23 containing a mixture of chromium granules and chromium fluoride, to which ammonium fluoride may be added. Components 24 are disposed in a basket 25, for example made of sheet nickel, having perforated cylindrical walls and closed by a cover 26. A tube 27 provided with a valve 28 is used for introducing argon, followed by a hydrogenated atmosphere, into vessel 21 so as to scavenge it and provide a reducing atmosphere. During heating, the mixture 23 liberates chromous fluoride, which reacts with hydrogen. The boron in the pre-casing is attacked by hydrofluoric acid vapour produced by the combination of fluorine, liberated by the decomposition of chromous fluoride, with the hydrogen present in the atmosphere. The hydrogen is discharged through a tube 29 and carries away the boron fluoride vapour. This method is perfectly suitable when the components have been completely coated with a boron pre-casing.

In diagram 2b, vessel 21 closed by cover 22 contains components 24 and also contains dishes 31 containing powder or filings of an alloy having a similar composition to that of the components and also containing chromous fluoride or a mixture of ammonium halides, for example the bromide and fluoride. A tube 32 provided with a three-way valve 33 is used for scavenging at the beginning of the treatment and as a source of hydrogenated atmosphere, which is discharged through the apertures between chamber 21 and cover 22. This method, wherein the halogenated atmosphere in the vessel is kept at equilibrium whereby the material forming the components is reduced, is particularly suitable when the components comprise pre-casing resists (for example at the bases of mobile blades for reactors), since it eliminates any risk of modifying the surface composition of the masked areas.

Figure 2C:
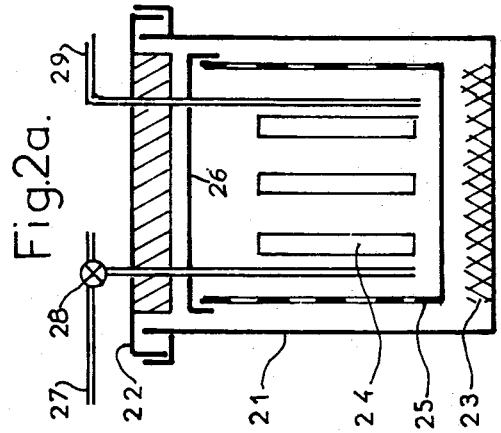

In the diagram in FIG. 2c, components 24 are immersed in vessel 21 in a reactive material 41 comprising a powdered refractory diluent (for example aluminium or magnesia) mixed with powders or filings of nickel, cobalt or refractory alloys and powdered halides such as ammonium chloride, ammonium fluoride or chromium fluoride. This method is substantially slower than the preceding one owing to the low thermal conductivity of the inert diluent, and the processed components have a less smooth, shiny surface. On the other hand, the method has an advantage in that, during the elimination of boron and the pre-diffusion, the chemical composition of the pre-casing can be adjusted by varying the composition of the metal constituents of the reactive substance. If, for example, the composition is similar to that of the substrate, the boron will be eliminated from the pre-casing, which will diffuse without any elements being supplied; if the reactive material has a higher chromium content than the substrate, the pre-casing will be enriched in chromium. In any case, it is preferable to use powders or filings of alloy. For example, a reactive mass of powdered homogeneous alloy containing 30% nickel and 70% cobalt, which is easily prepared by known methods of diffusion in a halogenated atmosphere, can be used to increase the proportion of cobalt in a nickel-boron pre-casing.

Irrespective of the method of operation and the composition of the pre-casing, the thermal treatment for eliminating boron and pre-diffusion is usually carried out in a few hours at a temperature near 1050° C. The values, however, can vary very considerably depending on the desired results and the means available. In principle, the duration of treatment increases when the temperature decreases, for example from a fraction of an hour at 1250° C. to about 20 hours at 800° C. Clearly, the structure of the resulting layers depends on the operating conditions. For example (slightly anticipating the description hereinafter of the casing temperature, that is the formation of the protective layers), a deposit of nickel-boron on cobalt-based super-alloys followed by brief treatment at moderate temperature for eliminating the boron and for pre-diffusion and thermochemical treatment for providing a casing by chromoaluminization in a halogenated atmosphere, results finally in a casing having an external part which mainly comprises nickel aluminides containing chromium, whereas prolonged elimination treatment at elevated temperature gives a casing, the outer part of which comprises both nickel aluminides and cobalt aluminides containing chromium.

Clearly, the semi-tight seals in diagrams 2a and 2c can be replaced by other known features, such as sand seals, vitreous seals, or sealing-tight closure means comprising valves.

An advantage of the process according to the invention is that the boron can be eliminated even if the boron pre-casing is covered with additional pre-casings of noble metals. For example, the areas on the components which are most fragile and most exposed to corrosion, for example, the trailing and leading edges of mobile blades of reactor turbines, can be covered, after pre-casing treatment, with deposits of platinum and/or palladium by electrolysis or by coating with thermochemical diffusion layers, and can then be subjected to elimination treatment. The boron is easily eliminated through the additional deposits.

Pre-casing treatment according to the invention does not involve any restriction in the choice of casing treatment or any special precautions. Any known thermochemical treatment can be used, for example comprising the deposition of chromium or aluminium or chromium and aluminium and preceded if necessary by treatment for forming diffusion barriers comprising tantalum, yttrium or the like. No special surface preparation by polishing, sanding or the like is necessary, As a rule, the operating behaviour of the resulting casings is substantially improved by pre-casing. However, as will be seen from the description of the following embodiments, the results are particularly spectacular when the casing is obtained by chromo-abuminization in a reactive mass wherein the metals to be deposited are pre-alloyed in the form of powder having a very fine particle size — of the order of 1 micron.

The following Examples further illustrate the present invention.

EXAMPLE 1a

Protection of blade sectors for turbine stator rings for reactors cooled by multiple perforations (multi-apertures) made of X 40 cobalt-based refractory super-alloy.

The percentage composition by weight of X 40 alloy is as follows:

C : 0.5, Cr : 25, Ni : 10, W : 17.5, Fe : 1.5, Remainder: Cobalt.

The components, together with control test-pieces, were treated as follows:

Pre-casing with nickel-boron to a uniform thickness of 25 microns by immersion at 90° C. for 2 hours in an aqueous bath having the aforementioned composition, elimination of the boron and pre-diffusion by annealing in a fluorinated reducing atmosphere at equilibrium for 4 hours at 1040° C., and chromo-aluminization for 20 hours at 1080° C., in a reactive substance comprising a mixture of very finely powdered chromiumaluminium alloy (average particle size: one micron) and an inert diluent and 0.5% by weight of ammonium chloride.

The thus-treated components were light grey and the outer coating had a uniform total thickness (casing plus pre-casing) of 85 microns. The outer coating was quite ductile even when cold. An examination of the test-pieces under an electron microscope shows that they comprise a mixture of nickel aluminide and cobalt aluminide containing chromium, and the connecting layer to the substrate comprises a homogeneous dispersion of fine particles of certain compounds which contain boron and appear to be boron carbonitride. The cobalt and nickel contents of the aluminides are in excess of the stoichiometric value. The aluminium content decreases very continuously from the surface to the junction region, whereas the chromium content increases. The casing was free from any discontinuity or pitting.

During oxidation tests in air at 1100° C. with very abruptly-varying heating cycles, the test-pieces remained intact after 300 hours of tests. During tests of resistance to sulphuration at 1000° C. in combustion gases from a fuel containing 1% sulphur, the combustion was controlled so that the gases were alternately oxidising and reducing. The coating of the test-pieces was resistant for more than 1000 hours.

EXAMPLE 1b

Comparative tests were carried out on test-pieces having the same constitution as in Example 1a and chromo-aluminized in the same manner, but without receiving the pre-casing treatment according to the invention.

The thus-treated components were light grey. The total thickness of the casing was 45 microns. It was regular but the coating was not very ductile. An examination with a electron microscope showed that the casing consisted mainly of cobalt aluminide containing coalesced inclusions of carbides and of certain compounds rich in chromium. During oxidation and sulphuration tests identical with those of Example 1a, it was found that deterioration as a result of oxidation began after about 65 hours and deterioration as a result of sulphuration began after 300 hours.

EXAMPLE 1c

Comparative tests were carried out on test-pieces having the same constitution as those in Example 1a and 1b and having the same pre-casing and chromo-aluminized in the same manner as the test-pieces in Example 1a but without receiving treatment for eliminating boron.

During oxidation and sulphuration tests, the thus-coated test-pieces showed scaling and pitting after only a few dozen hours.

EXAMPLE 2

Protection of blades made of nickel-based alloys containing heavy metals (MAR 200).

The percentage composition by weight of MAR 200 alloy is as follows:

C : 0.15, Cr : 9, Co : 10, W : 12.5, Nb : 1, Ti : 2, Al : 5, Remainder: Nickel.

The structure of this alloy, like that of other cobalt or nickel-based alloys containing a small proportion of carbon but relatively rich in "heavy" elements (for example W, Nb, Mo, Ta) comprises inclusions of intermetallic compounds which have the same disadvantages, though to a lesser degree, as those of carbon-rich alloys. The components were processed as follows:

Chemical deposition of cobalt-boron, 10 microns thick,
chemical deposition of nickel-boron, 10 microns thick,
elimination of boron by the same treatment as in Example 1a,
electrolytic deposition of platinum (15 microns thick) on the trailing edges, and
chromo-aluminization under the same conditions as in Example 1a.

The results were similar to those of Example 1a.

EXAMPLE 3

Comparative tests were conducted on blades made from an alloy comprising a nickel-chromium matrix with a guided reinforcement phase of niobium carbide fibres. The total percentage composition by weight of the alloy was:

C : 0.8, Cr : 10, Nb : 7.7, Remainder: Nickel.

After guided solidification involving eutectic segregation phenomena, the alloy comprised nioubium carbide fibres in a matrix comprising a solid solution of nickel and chromium.

The treatment, during which resists were applied to the feet of the blades, comprised the following:

Chemical deposition of cobalt-boron, 10 microns thick,
chemical deposition of nickel-boron, 10 microns thick,
elimination of the boron and pre-diffusion by annealing the components in a fluorinated reducing atmosphere at equilibrium for 6 hours at 1050° C., and
chromo-aluminization for 12 hours at 1065° C.

The resistance of the thus-treated components to oxidation and sulphuration when hot was practically the same as for the components in Example 1a. Here, the results are even more in that when components are given a casing by chromo-aluminization without a pre-casing according to the invention, the protective coating has very low resistance to corrosion owing to the many surface non-uniformities due to the emergent carbon fibres.

EXAMPLE 4

Protection of fuel injectors made of nickel-based (PD 16) (Example 4a) or Nimomic 105 (Example 4b) super-alloy used in power gas turbines.

The percentage composition by weight of PD 16 alloy is as follows:

C : 0.13; Cr : 6; Al : 6; W : 11; Mo : 2; Nb : 1.5; Remainder: Nickel.

The percentage composition of Nimomic 105 is:

C : 0.2; Cr : 15; Al : 45; Co : 20. Mo : 5; Ti : 1.2; Remainder: Nickel

During operation, injectors are exposed to corrosion by impurities from industrial fuels, more particularly sulphur, vanadium and saline sprays. The normal operating temperature is not very high but rapidly reaches 900° to 950° C., owing to radiation effects, when the installations are periodically stopped. Consequently, the injectors undergo abruptly-varying heating cycles resulting in very severe corrosion in the fine injector ducts.

The components were processed as follows:

Chemical deposition of nickel-boron, 30 microns thick,
elimination of boron and pre-diffusion by annealing in a fluorinated reducing atmosphere at equilibrium for 6 hours at 1040° C., and
chromization for 20 hours at 1065° C. in a reactive pre-alloyed material inititially comprising a very finely powdered (average particle size 5 microns) mixture of Cr : 40%, Si : 10%: Misch metal: 5%; calcined alumina: 45% and 0.5% by weight of aluminium chloride.

Silicon, which is present with chromium in the resulting casing, improves resistance to corrosion produced by oxygen derivatives of vanadium in fuel. Misch metal eliminates any oxide (inter alia chromium oxide) inclusion in the resulting casings.

The protective coating formed on PD 16 had a uniform thickness of 65 microns. The coating formed on Niomonic Nimomic 105 had a uniform thickness of 70 microns.

During comparative tests under actual operating conditions comprising abruptly varying heating cycles, serious corrosion of the non-processed components was found after about 100 hours, whereas the coating on the processed components was resistant for more than 1000 hours.

The preceding Examples show that the method according to the invention is particularly efficient in improving the resistance to hot corrosion of components made of refractory alloys containing a high proportion of carbon or heavy elements. Supplementary tests have shown that the method can be applied to iron or stainless-steel components having complex shapes and subjected to severe corrosion conditions. The service life is very considerably prolonged, irrespective of whether the outer protective casing is made by chromo-aluminization or by simple chromization.

Furthermore, the boron-eliminating process, which is one of the steps of the process according to the invention, very advantageously facilitates the protection of composite components made up of elements assembled by nickel-boron brazing. Nickel-boron hard solders, which melt at 1050°–1100° C., are easy to use and are suitable for assemblies which withstand high temperatures. Unfortunately, as Example 1c showed, boron greatly reduces the corrosion resistance of the protective casings. The treatment according to the invention can eliminate this disadvantage and also raise the melting-point of the brazed regions, as shown by Example 5 hereinafter.

EXAMPLE 5

Protection of blades cooled by brazed internal tubes.

The blades were made of MAR 509 cobalt alloys having the following percentage composition by weight:

C : 06; Cr : 21.5; Ni : 10; W : 7; Ta : 3.5; Ti : 0.2; Zr : 0.5 Remainder: Cobalt The tubes were brazed with a hard solder having the composition:

Cr : 15; B : 3.5; C : 0.1; Remainder: Nickel and melting at a temperature of 1055° C.

When the components were processed by chromo-aluminization without special precautions in a powdered chromium-aluminium alloy reactive material or cement, the cement was found to adhere to the brazed area.

On the other hand, when brazed blades were subjected, before chromo-aluminization, to annealing for 6 hours at 1050° C. in a chlorinated reducing atmosphere at equilibrium, obtained from a mixture of MAR 509 alloy filings and ammonium chloride, the cement did not adhere and the tubes did not bend, although chromization treatment was performed at 1120° C. for 16 hours.

In conclusion, it is theoretically possible to use non-chemical means to form the nickel and/or cobalt alloy pre-casing. Since boron is a vigorous flux for metal oxides, molten nickel or cobalt alloys with boron are excellent at wetting metal surfaces. For example, the components to be pre-cased can be sprinkled with an aforementioned alloy in powder form, for example powdered boron hard solder, and heated at a sufficient temperature in an oxidizing atmosphere or in vacuo, either in a furnace or by surface heating, by a known method such as induction or by an electron beam. However, particularly if the components have complex shapes, the resulting deposits are generally thicker and less uniform than deposits obtained by chemical means, which are, therefore, preferable as a rule.

We claim:

1. In a process of forming a coating selected from nickel and cobalt-based coatings on a surface of a component comprising a metallic refractory material comprising at least 50% by weight of metal selected from the group consisting of iron, cobalt and nickel, the improvement comprising, forming chemically at least one layer comprising an alloy of boron with a member selected from the group consisting of nickel, cobalt and nickel/cobalt on the component, said layer being deposited by immersing the surface of the component in an aqueous bath containing at least one boron salt and at least one salt selected from nickel salts and cobalt salts, after which the boron is eliminated from the layer by heating the coated component in a halogenated and hydrogenated atmosphere at a temperature between 800° and 1250° C, the elimination of the boron being accompanied by diffusion of at least one of cobalt and nickel into the metallic refractory material.

2. An improved process according to claim 1 wherein the metallic material contains at least 0.4% by weight of carbon and comprises refractory-metal carbide fibers in a matrix containing at least one metal selected from the group consisting of iron, cobalt, nickel and chromium.

3. An improved process according to claim 1, wherein the thickness of the alloy layer is between 5 and 70 microns.

4. An improved process according to claim 1, wherein the thickness of the alloy layer is between 10 and 40 microns.

5. An improved process according to claim 1, wherein the component is heated in the presence of a source of chromous fluoride.

6. An improved process according to claim 1, wherein the component is heated in the presence of a source of halogens and of a finely-divided alloy having a composition similar to that of the processed metallic material.

7. An improved process according to claim 1, wherein the component is heated in a reactive material comprising chemically inert particulate metal mixed with a source of halogen.

8. An improved process according to claim 1, wherein the coating comprises a pre-casting, on which a casing is subsequently deposited.

9. An improved process according to claim 8 wherein the casing comprises an alloy containing at least one metal selected from chromium and aluminum in a proportion substantially higher than in the processed metallic material.

10. An improved process according to claim 9, wherein the casing is deposited by heating the component in a reactive material comprising a chemically inert powder mixed with a halogenated compound and a powdered aluminum-chromium alloy having a particle size greater than one micron.

11. A metallic component having a nickel- or cobalt-based coating thereon and made by the process of claim 1.

12. A metallic component having a pre-casting and a casing and made by the process of claim 8.

UNITED STATES PATENT AND TRADEMARK OFFICE
CERTIFICATE OF CORRECTION

PATENT NO. : 4,055,706

DATED : October 25, 1977

INVENTOR(S) : Philippe M. Galmiche and Pierre J. Lepetit

It is certified that error appears in the above-identified patent and that said Letters Patent are hereby corrected as shown below:

This application claims priority of French Patent Application Serial No. 74.24694 filed July 16, 1974, Signed and Sealed this Second Day of May 1978

[SEAL]

Attest:

RUTH C. MASON
Attesting Officer

LUTRELLE F. PARKER
Acting Commissioner of Patents and Trademarks